United States Patent
Morita et al.

(10) Patent No.: US 7,310,814 B2
(45) Date of Patent: Dec. 18, 2007

(54) SERVICE PROVIDING SYSTEM, SERVICE PROVIDING APPARATUS, SERVICE PROVIDING METHOD, AND PROGRAM FOR IMPLEMENTING THE METHOD

(75) Inventors: Hiroyasu Morita, Kanagawa (JP); Shigeo Yamagata, Kanagawa (JP); Isao Migishima, Ibaraki (JP); Hiroyoshi Yoshida, Tokyo (JP); Toshihiko Ikeno, Kanagawa (JP); Hiroshi Kaburagi, Kanagawa (JP); Naohiro Isshiki, Kanagawa (JP); Naoki Ito, Tokyo (JP)

(73) Assignee: Canon Kabushiki Kaisha (JP)

( * ) Notice: Subject to any disclaimer, the term of this patent is extended or adjusted under 35 U.S.C. 154(b) by 797 days.

(21) Appl. No.: 10/361,788

(22) Filed: Feb. 10, 2003

(65) Prior Publication Data

US 2003/0177368 A1 Sep. 18, 2003

(30) Foreign Application Priority Data

Feb. 8, 2002 (JP) .............................. 2002-032763

(51) Int. Cl.
*G06F 7/04* (2006.01)
*G06F 7/58* (2006.01)
(52) U.S. Cl. .................. 726/7; 726/1; 726/4; 726/5; 726/18; 726/19; 726/21; 726/26; 726/28; 713/164; 713/165; 713/167; 713/168
(58) Field of Classification Search .............. 726/5–7, 726/18, 19, 1, 4, 21, 26, 28; 713/183, 184, 713/164, 165, 167, 168
See application file for complete search history.

(56) References Cited

U.S. PATENT DOCUMENTS 5,606,663 A * 2/1997 Kadooka ..................... 726/18

(Continued)

FOREIGN PATENT DOCUMENTS

JP         03-230671 A     10/1991

(Continued)

OTHER PUBLICATIONS

Fumitoshi Ukai, "LDAP authentication Issue", UNIX USER Magazine, Jan. 1, 2002, p. 43, col. 1, Line 11, vol. 11, Issue 1, Soft Bank Publishing.

*Primary Examiner*—Kim Vu
*Assistant Examiner*—Beemnet W Dada
(74) *Attorney, Agent, or Firm*—Rossi, Kimms & McDowell, LLP

(57) ABSTRACT

There is provided a service providing system that is capable of preventing personal information on a user who has used a service from being leaked to other users without spoiling the convenience for the user, and increasing the frequency with which the user uses the service. The service providing system includes a service providing apparatus that provides a service for the user, and a password issuing device that issues a password with an expiration date that is made to correspond to identification information held by the user in response to the payment of a fee by the user. The service providing apparatus includes a memory that stores setting data used for simplifying operations relating to the service provided for the user, and a CPU. The CPU authenticates the user according to the identification information on the user, the password issued to the user, and the expiration date thereof, and gives the authenticated user a permission to perform operations on the setting data stored in the memory.

13 Claims, 12 Drawing Sheets

U.S. PATENT DOCUMENTS

| | | | |
|---|---|---|---|
| 6,738,810 B1 * | 5/2004 | Kramer et al. | 709/224 |
| 2002/0133464 A1 * | 9/2002 | Ress et al. | 705/51 |
| 2003/0072451 A1 * | 4/2003 | Pimentel et al. | 380/270 |

FOREIGN PATENT DOCUMENTS

| | | |
|---|---|---|
| JP | 3261258 A | 11/1991 |
| JP | 10-079817 A | 3/1998 |
| JP | 10-322529 A | 12/1998 |
| JP | 11-234496 A | 8/1999 |
| JP | 2001-016383 A | 1/2001 |
| JP | 2001-024824 A | 1/2001 |
| JP | 2002-007676 A | 1/2002 |

* cited by examiner

SERVICE PROVIDING SYSTEM, SERVICE PROVIDING APPARATUS, SERVICE PROVIDING METHOD, AND PROGRAM FOR IMPLEMENTING THE METHOD

BACKGROUND OF THE INVENTION

1. Field of the Invention

The present invention relates to a service providing system, a service providing apparatus, and a service providing method, which provide a service for the user in response to the user's operation, as well as a program for implementing the method.

2. Description of the Related Art

At a convenience store or the like, equipment such as a copying machine or a facsimile machine is installed to provide services for unspecified users. A digital copying machine having not only a copying function but also a facsimile function, an electronic mail function, a function of accumulating images in the machine is also possibly installed at a convenience store or the like. When transmitting documents read by a scanner by such equipment, proper settings as to the reading resolution, the reading mode, and so forth are made and settings as to information to be added to the documents being transmitted are made in accordance with the type of the documents. Further, it is necessary to input the telephone number, the electronic mail address, etc. of a destination.

To simplify such operations carried out in transmission, the above-mentioned equipment is provided with an address book function, a one-touch button control function, a patterned service function of storing transmission settings, a calling function of calling transmission settings from latest ones to ones made a predetermined number of times before the latest setting.

Further, the equipment may be provided with a Box function of temporarily storing documents in the equipment and then carrying out copying, transmission, printing, and so forth.

Every time the user uses the equipment, he or she has to pay a usage fee according to the number of copies made and the communication time.

At an ordinary office or the like where the equipment is used for business and the users may be specified, transmission settings such as facsimile numbers and electronic mail addresses of destinations, which have been registered by the address book function or the patterned service function provided in the equipment, and transmission settings made in the past and called by the calling function may be referred to by users other than the user who made the settings, without any problem.

However, transmission settings such as facsimile numbers and electronic mail addresses of destinations made in the equipment at a convenience store or the like, which are used by unspecified users, can be referred to by persons other than the user who made the transmission settings. This is not preferred in terms of personal information protection. For this reason, every time the user transmits documents via facsimile, he or she has to make settings as to reading and settings as to destinations, and this is very troublesome.

Likewise, it is not preferred that documents stored in the Box are referred to by other users, in terms of personal information protection. However, it is impossible to manage passwords of unspecified users and to apply the Box function using the passwords, and thus, the Box function cannot be provided for the user.

Further, every time the user uses the equipment, he or she has to pay a usage fee charged for the use of the equipment to a store where the equipment is placed. Since this is inconvenient for the user, he or she may not be motivated to come to the store again.

SUMMARY OF THE INVENTION

It is therefore a first object of the present invention to provide a service providing system, a service providing apparatus, and a service providing method, which can prevent personal information on a user who has used a service from being leaked to other users without spoiling the convenience for the user, and can increase the frequency with which the user uses the service, as well as a program for implementing the method.

It is a second object of the present invention to provide a service providing system, a service providing apparatus, and a service providing method, which can prevent personal information on a user who has used a service from being leaked to other users referring to a service history.

To attain the above first object, in a first aspect of the present invention, there is provided a service providing system comprising a service providing apparatus that provides a service for a user, and a password issuing device that issues a password with an expiration date that is made to correspond to identification information held by the user according to payment of a fee by the user, wherein the service providing apparatus comprises setting data storage means for storing setting data used for simplifying operations relating to the service provided for the user, authenticating means for authenticating the user according to the identification information on the user, the password issued to the user, and the expiration date thereof, and setting data operation permitting means for giving a permission to perform an operation on the setting data to the user authenticated by the authenticating means.

With the above arrangement, it is possible to prevent personal information on a user who has used a service from being leaked to other users without spoiling the convenience for the user, and increases the frequency with which the user uses the service.

Preferably, the setting data includes personal data and common data, and the setting data operation permitting means gives a permission to perform an operation on personal data corresponding to the user in the setting data to the user authenticated by the authenticating means.

More preferably, the operation on the personal data comprises an editing operation including new registration and correction of the personal data.

Also preferably, the service providing apparatus comprises setting data erasing means for erasing information contained in the personal data included in the setting data when the expiration date of the password has passed.

Preferably, the service providing apparatus provides a data transmission service as the service, and the setting data comprises data representing destinations and the like.

Also preferably, the service providing apparatus comprises patterned service data storage means storing patterned service data to be added when the service is provided for the user, and patterned service data operation permitting means for giving a permission to perform an operation on the patterned service data to the user authenticated by the authenticating means.

Preferably, the patterned service data includes personal data and common data, and the patterned service data operation permitting means gives a permission to perform an operation on personal data corresponding to the user in the patterned service data to the user authenticated by the authenticating means.

More preferably, the operation on the personal data comprises an editing operation including new registration and correction of the personal data.

Also preferably, the service providing apparatus comprises patterned service data erasing means for erasing information contained in the personal data included in the patterned service data when the expiration date of the password has passed.

Further preferably, the patterned service data comprises data representing destinations.

Preferably, the service providing apparatus comprises box function means including a plurality of boxes in which data is stored such that operations may be performed on the data, and box operation permitting means for giving the user authenticated by the authenticating means a permission to perform operations on the data stored in the box corresponding to the user.

More preferably, the operations on the data stored in the box include copying, printing, and transmission.

Also preferably, the service providing apparatus comprises box erasing means for erasing the data stored in the box corresponding to the user when the expiration date of the password issued to the user has passed.

To attain the first object, in a second aspect of the present invention, there is provided a service providing apparatus that provides a service for a user, comprising setting data storage means storing setting data used for simplifying operations relating to the service provided for the user, authenticating means for authenticating the user according to identification information on the user, a password issued to the user, and an expiration date thereof, and setting data operation permitting means for giving a permission to perform an operation on the setting data to the user authenticated by the authentication means.

To attain the first object, in a third aspect of the present invention, there is provided a service providing method for providing a service for a user, comprising the steps of issuing a password with an expiration date that is made to correspond to identification information held by the user in response to payment of a fee by the user, authenticating the user according to the identification information on the user, the password issued to the user, and the expiration date thereof, and giving a permission to perform an operation on the setting data to the authenticated user.

To attain the first object, in a fourth aspect of the present invention, there is provided a program executed by a service providing apparatus that provides a service for a user, comprising an authenticating module for authenticating the user according to identification information on the user, a password issued to the user, and an expiration date thereof, and a setting data operation permitting module for giving a permission to perform an operation on the setting data to the user authenticated by the authentication module.

To attain the second object, in a fifth aspect of the present invention, there is provided a service providing system comprising a service providing apparatus that provides a service for a user, and a password issuing device that issues a password with an expiration date that is made to correspond to identification information held by the user in response to payment of a fee by the user, wherein the service providing apparatus comprises managing means for holding and managing a service history concerning a service used by the user, authenticating means for authenticating the user according to the identification information on the user, the password issued to the user, and the expiration date thereof, permitting means for permitting the service history corresponding to the user authenticated by the authentication means to be outputted, and output means for outputting the service history permitted to be outputted.

With the above arrangement, it is possible to prevent personal information on a user from being leaked to other users referring to a service history.

Preferably, the output means comprises display means for displaying the service history.

Also preferably, the output means comprises printing means for printing the service history.

More preferably, the printing means is operable when the authenticated user is an administrator, to replace characters representing a history concerning a registered user in the service history with predetermined marks, and prints the service history.

Preferably, the service comprises a communication service in which data is transmitted, and the service history includes destinations.

To attain the second object, in a sixth aspect of the present invention, there is provided a service providing apparatus that provides a service for a user, comprising managing means for holding and managing a service history concerning the service used by the user, authenticating means for authenticating the user according to identification information on the user, a password issued to the user, and an expiration date thereof, permitting means for permitting the service history corresponding to the user authenticated by the authenticating means to be outputted, and outputting means for outputting the service history permitted to be outputted.

To attain the second object, in a seventh aspect of the present invention, there is provided a service providing method for providing a service for a user, comprising the steps of issuing a password with an expiration date that is made to correspond to identification information held by the user in response to payment of a fee by the user, holding and managing a service history concerning the service used by the user, authenticating the user according to the identification information on the user, the password issued to the user, and the expiration date thereof, permitting the service history corresponding to the user authenticated by the authenticating means to be outputted, outputting the service history permitted to be outputted.

To attain the second object, in an eighth aspect of the present invention, there is provided an program executed by a service providing apparatus that provides a service for a user, comprising a managing module for holding and managing a service concerning the service used by the user, an authenticating module for authenticating the user according to identification information on the user, a password issued to the user, and an expiration date thereof, a permitting module for permitting the service history corresponding to the authenticated user to be outputted, and an outputting module for causing output means to output the service history permitted to be outputted.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First Embodiment

Figure 1:
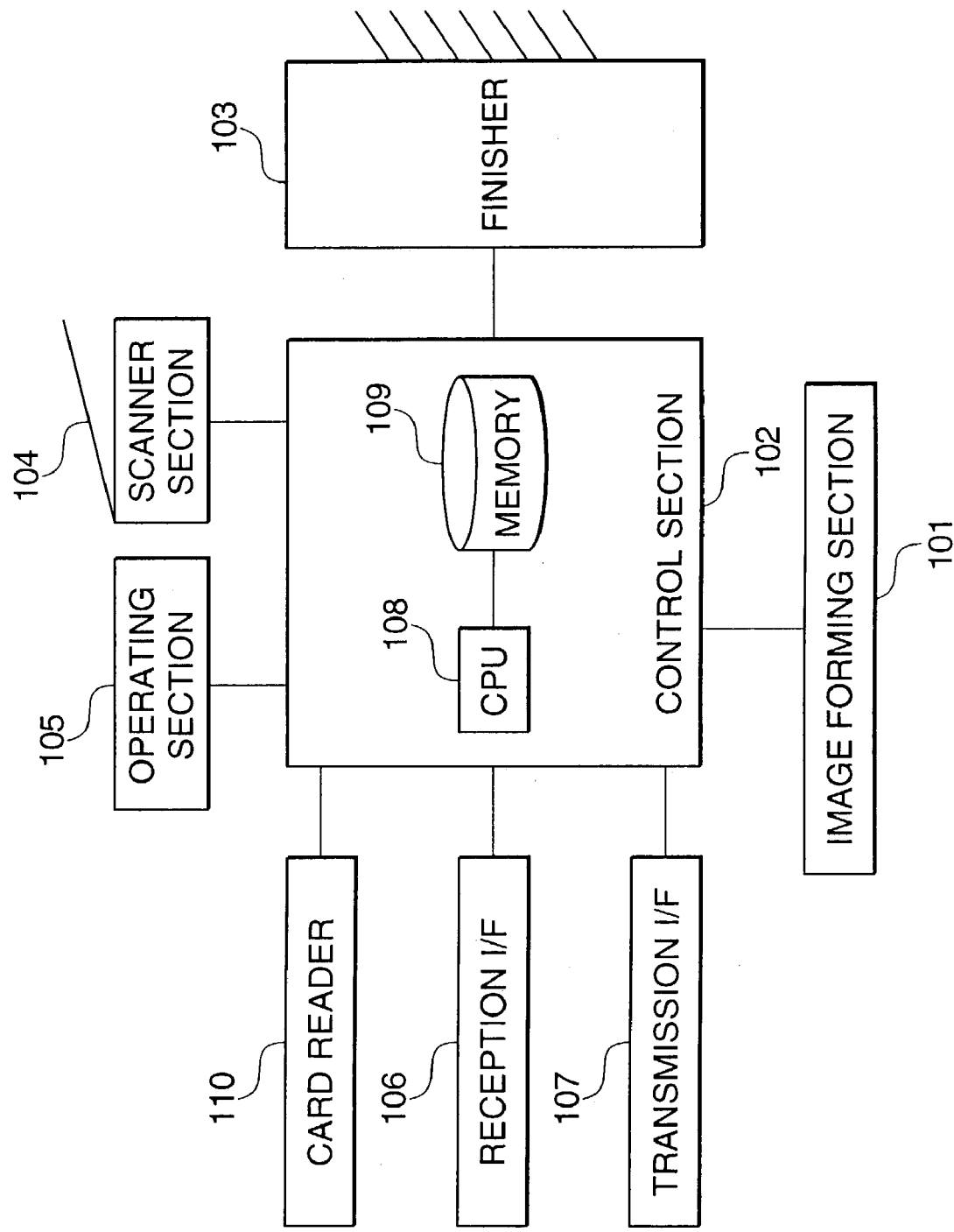
FIG. 1 is a block diagram showing the construction of a compound machine constituting a service providing system according to a first embodiment of the present invention.

FIG. 1 is a block diagram showing the construction of a compound machine constituting a service providing system according to a first embodiment of the present invention.

At a convenience store or the like, a compound machine is installed so as to provide a pay service for the user, and the compound machine is provided with a plurality of functions such as a copying function, a facsimile function, an electronic mail function, and a printing function. As shown in FIG. 1, the compound machine includes a control section 102 to which are connected an image forming section 101, a finisher 103, a scanner section 104, an operating section 105, a reception interface (hereinafter referred to as "the reception I/F") 106, a transmission interface (hereinafter referred to as "the transmission I/F") 107, and a card reader 110. The control section 102 includes a CPU 108 and a memory 109, and the CPU 108 controls the operations of the above-mentioned component parts according to programs stored in the memory 109, and performs a variety of processing. The operating section 105 is provided with a display panel, not shown, used for displaying various setting information, messages, and so forth.

The memory 109 stores setting data (in the present embodiment, an address book) that is intended to simplify the operations relating to service for the user. The memory 109 also stores programs for executing an authenticating process in which the user is authenticated based on user ID information, a password issued to the user, and the expiration date thereof, and an operation permitting process in which a permission to perform operations on data of the address book is given to the user authenticated by the authenticating process.

In the present embodiment, the compound machine provides a data transmission service (including the transmission of facsimiles and electronic mails) for users. In the data transmission service, an original is set on the scanner section 104 or a document stored in advance in the memory 109 is designated through the operation of the operating section 105, and a destination is selected through the operation of the operating section 105. In response to an instruction for transmitting the original or document, an image on the original read by the scanner section 104 or the specified document stored in the memory 109 is transmitted to the selected destination by facsimile or electronic mail. On this occasion, the destination may be set as a new destination, or the address book may be called to set the destination to a destination set in advance in the machine.

When using the data transmission service, it is necessary to authenticate the user by reading a member card of the user. A user ID, password, and expiration date of the password are written in the member card. The password written in the card is purchased by the user.

Figure 2:
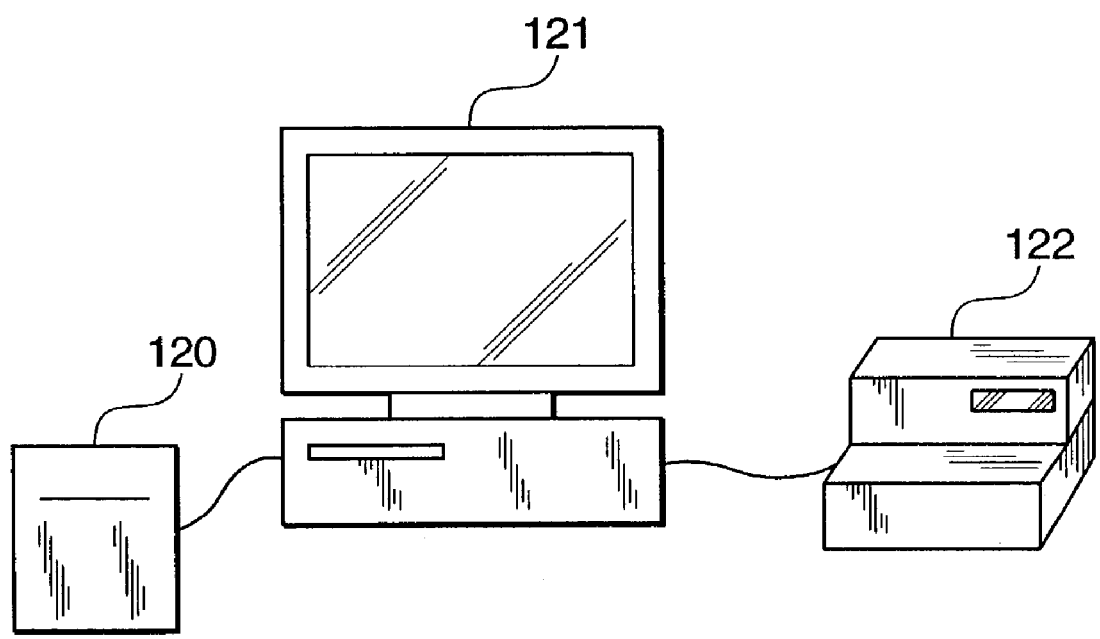
FIG. 2 is a view showing the appearance of a password issuing device that constitutes the service providing system in cooperation with the compound machine in FIG. 1.

Referring next to FIG. 2, a description will be given of an apparatus that issues the password to the user. FIG. 2 is a view showing the appearance of a password issuing device that constitutes the service providing system in cooperation with the compound machine shown in FIG. 1.

The password issuing device is comprised of a card reader 120, a personal computer 121, and a casher 122 as shown in FIG. 2. To acquire a password with an expiration date, which is valid for a predetermined period of time, the user pays for the password and the password issuing device then writes the password and the expiration date thereof in the user's member card.

Figure 3:
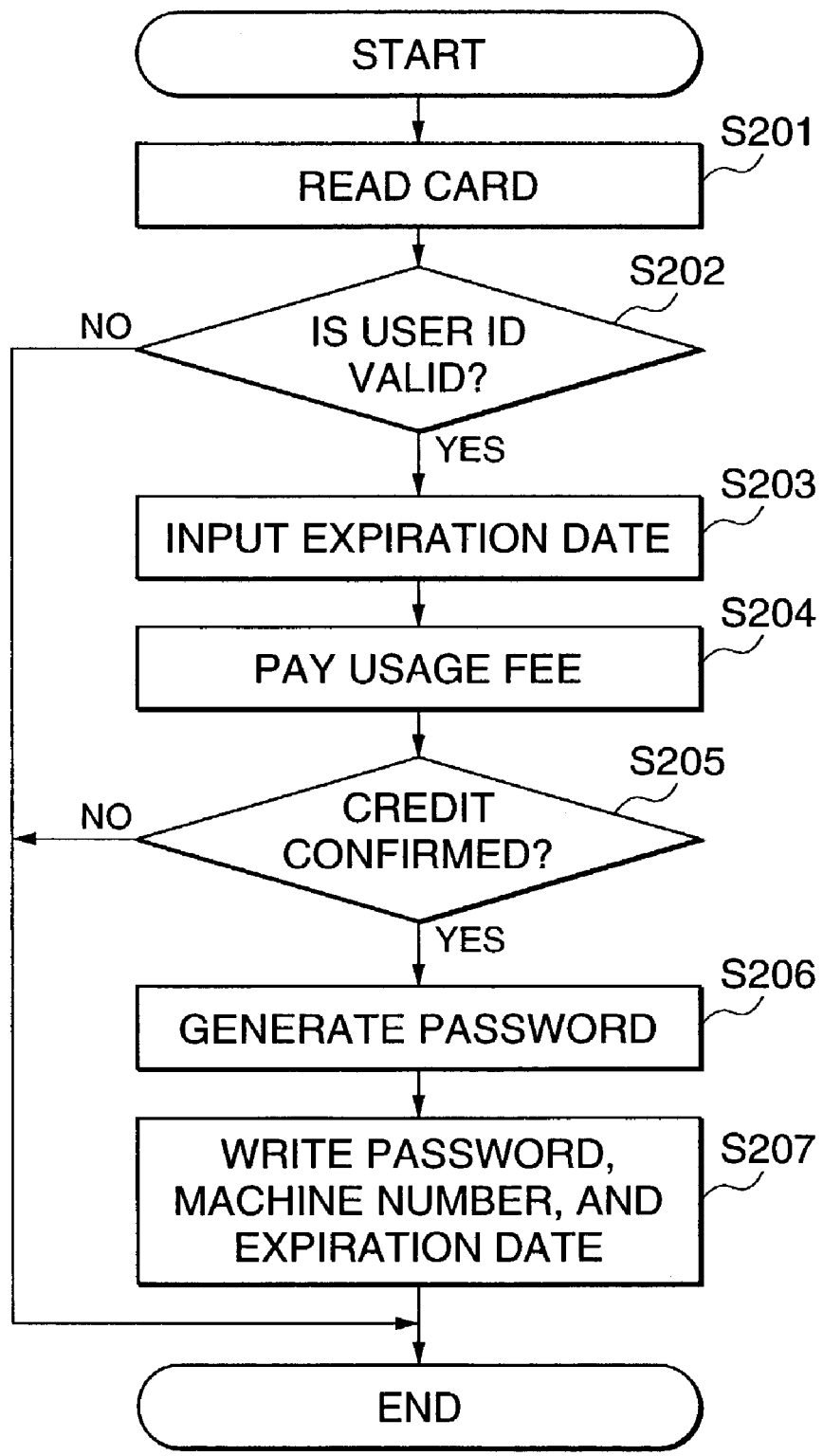
FIG. 3 is a flow chart showing the procedure for carrying out a password issuing process by the password issuing device in FIG. 2.

Referring next to FIG. 3, a description will be given of a password issuing process carried out by the password issuing device. FIG. 3 is a flow chart showing the procedure for carrying out the password issuing process carried out by the password issuing device shown in FIG. 2.

In the password issuing device, as shown in FIG. 3, first, the card reader 120 reads the user's member card in a step S201, and in the next step S202, the personal computer 121 determines whether the user ID written in the member card is valid or not. If it is determined in the step S202 that the user ID written in the member card is valid, the expiration date of the password given to the user is inputted through a keyboard of the personal computer 121 in a step S203, and the usage fee paid by the user is then credited to the casher 122 in a step S204.

In the next step S205, the personal computer 121 determines whether or not a predetermined amount of money has been credited to the casher 122 in the step S204. If it is determined in the step S205 that the predetermined amount of money has been credited to the casher 122, the personal computer 121 generates the password with the expiration date inputted in the step S203 in a step S206, and the card reader 120 then records the password generated in the step S206, the expiration date of the password, and machine numbers of usable machines on the user's member card in a step S207.

If it is determined in the step S202 that the user ID written in the user's member card is not valid, the process is terminated. Also, if it is determined in the step S205 that the predetermined amount of money has not been credited to the casher 122, the process is terminated.

Figure 4:
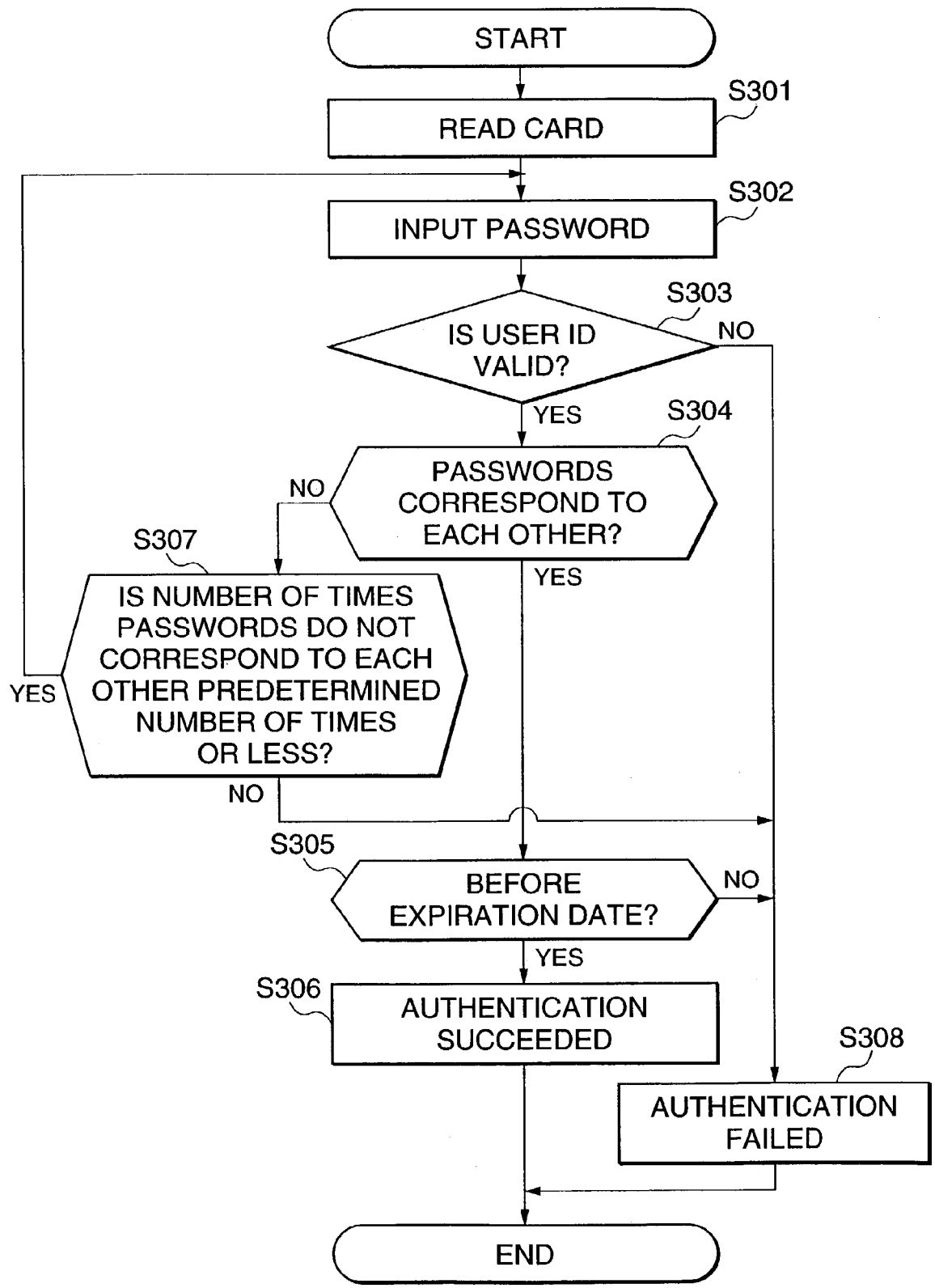
FIG. 4 is a flow chart showing the procedure for authenticating a user by the compound machine in FIG. 1.
Figure 5:
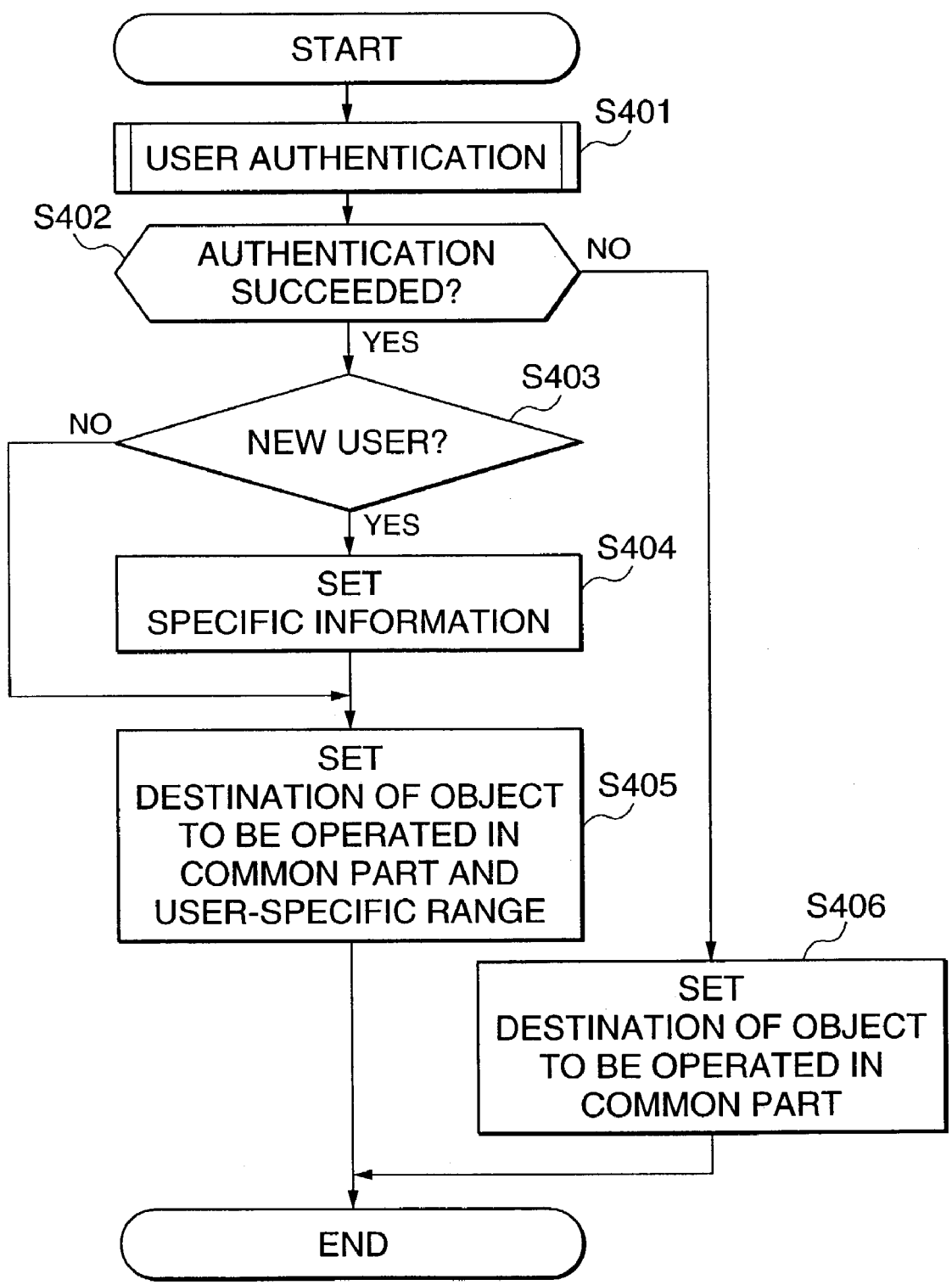
FIG. 5 is a flow chart showing the procedure for determining the usable range of an address book by the compound machine in FIG. 1.
Figure 6:
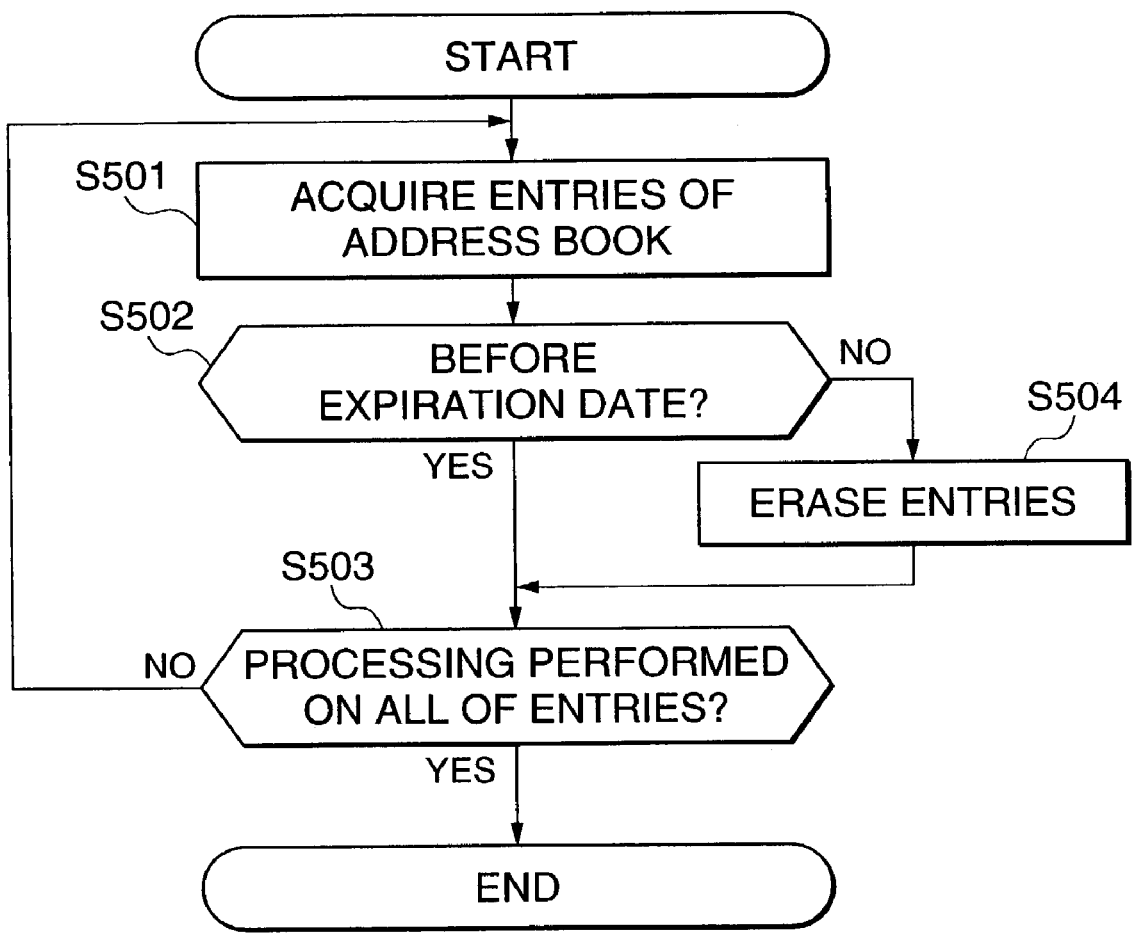
FIG. 6 is a flow chart showing the procedure for erasing entries of the address book having expired by the compound machine in FIG. 1.

Referring next to FIGS. 4 to 6, a description will be given of how to use the data transmission service provided by the compound machine. FIG. 4 is a flow chart showing the procedure for carrying out a user authenticating process by the compound machine shown in FIG. 1, FIG. 5 is a flow chart showing the procedure for carrying out an address book usable range determining process by the compound machine shown in FIG. 1, and FIG. 6 is a flow chart showing the procedure for erasing entries of an address book having expired by the compound machine shown in FIG. 1. All of these processes shown in FIGS. 4 to 6 are executed by the CPU 108.

When the user uses the data transmission service, the user is authenticated first. To authenticate the user, first the user ID written in the member card held by the user is read via the card reader 110 in a step S301, and the password inputted via the operating section 105 by the user is then captured in a step S302.

In the next step S303, it is determined whether the user ID written in the user's member card is valid or not. If it is determined in the step S303 that the user ID is not valid, an authentication fail process is carried out in a step S308. In the authentication fail process, a message to the effect that the user authentication has failed is displayed on the display panel of the operating section 105 to notify the user that the user authentication has failed. The user authenticating process is then terminated.

On the other hand, if it is determined in the step S303 that the user ID is valid, it is then determined in a step S304 whether the password inputted in the step S302 corresponds to the password read from the member card. If the passwords do not correspond to each other, it is then determined in a step S307 whether or not the number of times the passwords do not correspond to each other is equal to or less than a predetermined number of times. This is intended to enable the user to input a password again based on the assumption, for example, that the user has inputted an incorrect password via the operating section 105. If it is determined in the step S307 that the number of times the passwords do not correspond to each other is equal to or less than the predetermined number of times, the process returns to the step S302 wherein a password inputted again is captured. If it is determined in the step S307 that the number of times the passwords do not correspond to each other is not equal to or less than the predetermined number of times, the authentication fail process is carried out in the step S308. The present process is then terminated.

If it is determined in the step S304 that the passwords correspond to each other, it is then determined in a step S305 whether the expiration date of the passwords has passed or not. If the expiration date of the passwords has passed, the authentication fail process is carried out in the step S308 to terminate the present process. On the other hand, if it is determined in the step S305 that the expiration date of the passwords has not yet passed, an authentication success process is carried out in a step S306. In this authentication success process, a message to the effect that the user has been authenticated successfully is displayed on the display panel of the operating section 105, and settings are made to enable the user to perform operations relating to the data transmission service. The present process is then terminated.

Referring next to FIG. 5, a description will be given of the procedure for determining the usable range of the address book, which is used when the user uses the data transmission service.

To determine the usable range of the address book for the user, the user authentication is carried out first in a step S401 as shown in FIG. 5. The user authentication is carried out by the same procedure as the procedure shown in FIG. 4, and therefore a description thereof is omitted. In a step S402, it is determined whether the user has been authenticated successfully or not. If it is determined in the step S402 that the user has been authenticated successfully, it is then determined in a step S403 whether the authenticated user is a new user for the machine or not. In this case, even in the case where the user has used the machine, he or she is regarded as a new user if he or she uses the machine for the first time after repurchasing a password to acquire the right to use the machine after the expiration date of an old password had passed. If the authenticated user is a new user, settings as to new user-specific information such as a user-specific address book range are made in a step S404. In the next step S405, the user-specific range set in the step S404 and a common part determined by the system are added together as the usable range of the address book, and the present process is then terminated.

On the other hand, if it is determined in the step S403 that the authenticated user is not a new user, the process proceeds to a step S405 with the step S404 being skipped.

If it is determined in the step S402 that the user has not been authenticated successfully, only the common part determined by the system is regarded as the usable range of the address book, and the present process is then terminated.

Referring next to FIG. 6, a description will be given of a process in which entries of the address book having expired are erased.

In this process, as shown in FIG. 6, first entries of the address book stored in the memory 109 are acquired in a step S501, and it is then determined in a step S502 whether the expiration date of the acquired entries has passed or not. If it is determined in the step S502 that the expiration date of the acquired entries has passed, the corresponding entries are erased from the memory 109 in a step S504, and the process then proceeds to a step S503. On the other hand, if it is determined in the step S502 that the expiration date of the acquired entries has not yet passed, the process proceeds to a step S503 with the step S504 being skipped.

It is determined in the step S503 whether processing has been performed on all of the entries of the address book or not. If it is determined that processing has not been performed on all of the entries, the process returns to the step S501. On the other hand, if it is determined that processing has been performed on all of the entries, the process is terminated.

As described above, according to the present embodiment, it is possible to prevent the user's personal information contained in the address book, which is intended to simplify the use of the service, from being leaked to other users without spoiling the convenience for the user. Further, it is possible to increase the frequency with which the service is used, and to thus increase the frequency with which the user comes to a store where the copying machine providing the service is installed.

Figure 7:
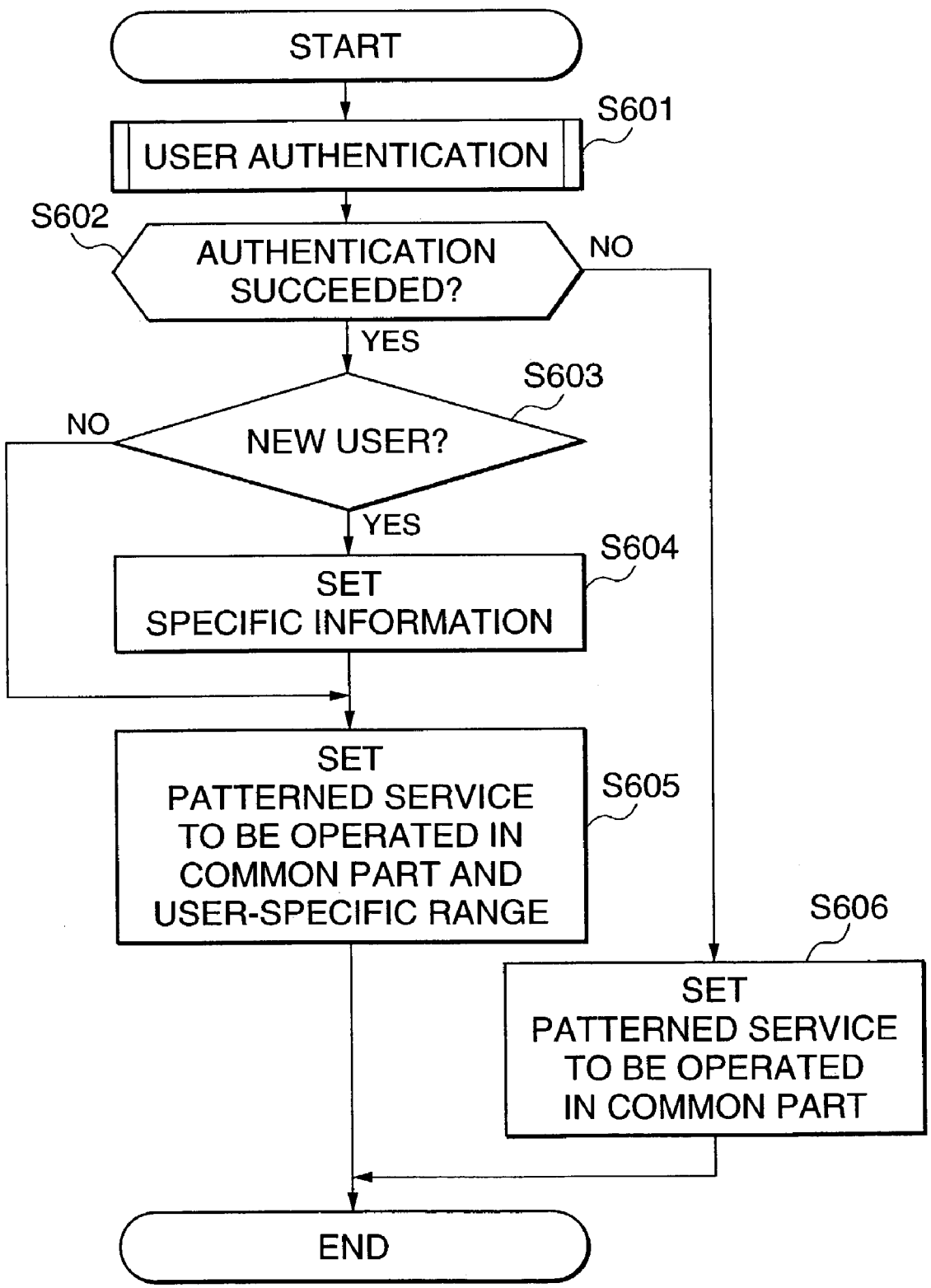
FIG. 7 is a flow chart showing the procedure for determining the usable range of a patterned service by a service providing system according to a second embodiment of the present invention.

A description will now be given of a second embodiment of the present invention with reference to FIG. 7. FIG. 7 is a flow chart showing the procedure for determining the usable range of patterned services by a service providing system according to the second embodiment of the present invention. The arrangement of the service providing system according to the second embodiment is identical with that of the service providing system according to the first embodiment, and therefore a description thereof is omitted.

The present embodiment is different from the first embodiment in that a patterned service function is added.

The patterned service function is a function of storing additional information used in transmission such as data of settings as to reading in transmission, the destination of a document to be transmitted, and a timer set value. According to the present embodiment, it is arranged that a permission to perform operations on data stored by the patterned service function is given to the authenticated user.

To determine the usable range of the patterned service, first the user authentication is carried out in a step S601 as shown in FIG. 7. The user authentication is carried out by the same procedure as the procedure shown in FIG. 4, and therefore a description thereof is omitted.

In a step S602, it is then determined whether the user has been authenticated successfully or not. If it is determined in the step S602 that the user has been authenticated successfully, it is then determined in a step S603 whether the authenticated user is a new user for the compound machine or not. In this case, even in the case where the user has used the compound machine, he or she is regarded as a new user if he or she uses the machine for the first time after repurchasing a password to acquire the right to use the compound machine after the expiration date of an old password had passed. If the authenticated user is a new user, new user-specific patterned service is set in the memory 109 in a step S604. In the next step S605, the user-specific range set in the step S604 and a common part determined by the system are added together as the usable range of the patterned service, and the process is then terminated.

On the other hand, if it is determined in the step S603 that the authenticated user is not a new user, the process proceeds to a step S605 with the step S604 being skipped.

If it is determined in the step S602 that the user has been authenticated unsuccessfully, only the common part determined by the system is regarded as the usable range of the patterned service, and the process is then terminated.

The method for erasing the personal patterned service having expired may be implemented by replacing the entries of the address book with the personal patterned service in the address book entry erasing process shown in FIG. 6.

Figure 8:
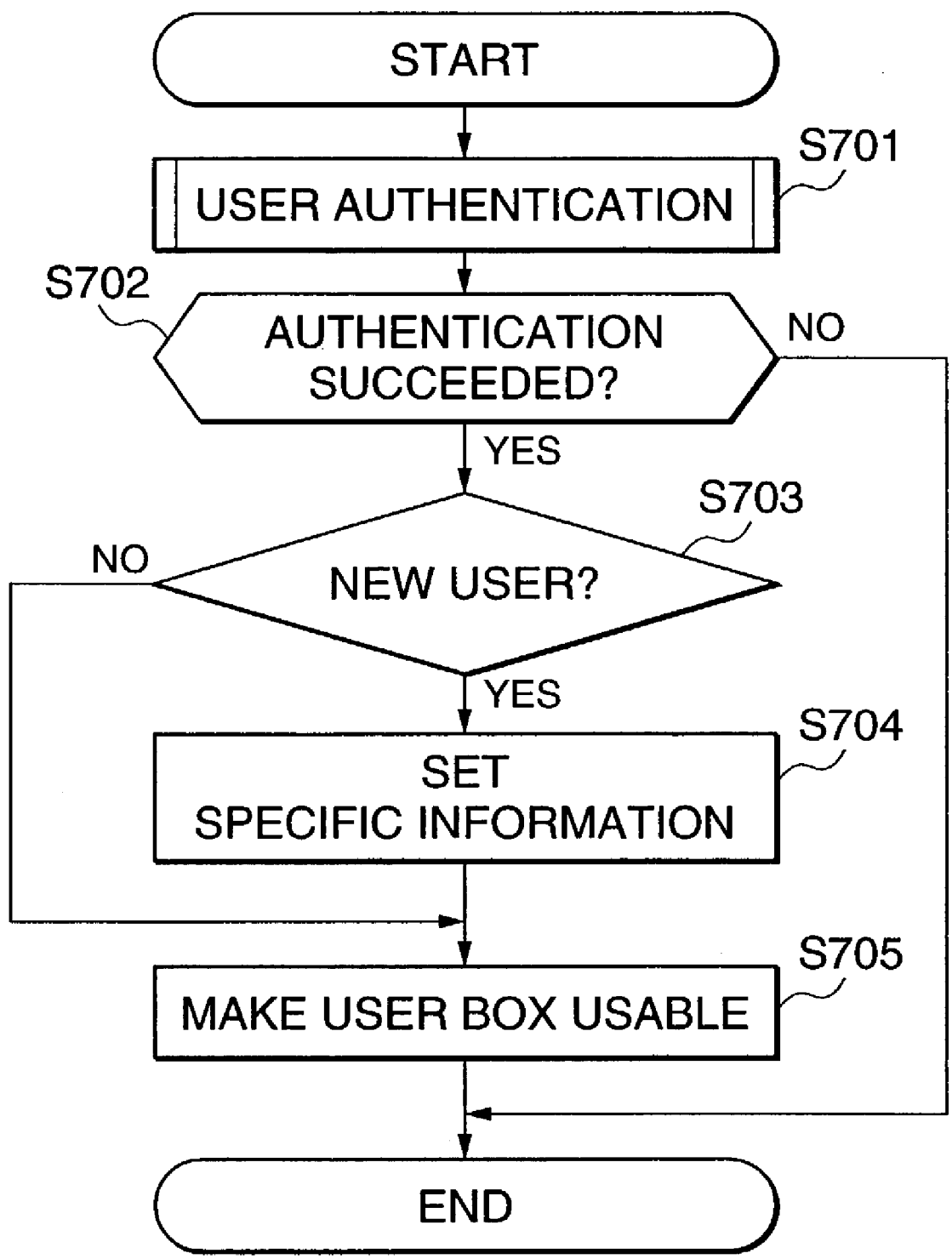
FIG. 8 is a flow chart showing the procedure for setting a usable Box by a service providing system according to a third embodiment of the present invention.

A description will now be given of a third embodiment of the present invention with reference to FIG. 8. FIG. 8 is a flow chart showing the procedure for carrying out a usable Box setting process by a service providing system according to the third embodiment of the present invention. The arrangement of the service providing system according to the third embodiment is identical with that of the service providing system according to the first embodiment, and therefore a description thereof is omitted.

The present embodiment is different from the first embodiment in that a Box function of storing documents once in the memory 109 and then carrying out copying, printing, transmission, and the like of the documents is added. According to the present embodiment, it is arranged that a permission to perform operations on data stored in a Box corresponding to the user among a plurality of Boxes storing data such that operations may be performed on the data is given to the authenticated user.

To set a usable Box in the compound machine, first the user authentication is carried out in a step S701 as shown in FIG. 8. The user authentication is carried out by the same procedure as the procedure shown in FIG. 4, and therefore a description thereof is omitted.

Then, in a step S702, it is determined whether the user has been authenticated successfully or not. If it is determined that the user has been authenticated successfully, it is then determined in a step S703 whether the authenticated user is a new user for the compound machine or not. In this case, even in the case where the user has used the compound machine, he or she is regarded as a new user if he or she uses the machine for the first time after repurchasing a password to acquire the right to use the copying machine after the expiration date of an old password had passed. If the authenticated user is a new user, new user-specific information such as a user-specific Box range is set in the memory 109 in a step S704. In the next step S705, the user-specific Box set in the step S704 is regarded as a usable Box, and the process is then terminated.

On the other hand, if it is determined in the step S703 that the authenticated user is not a new user, the process proceeds to a step S705 with the step S704 being skipped.

The method for erasing a personal Box having expired may be implemented by replacing the entries of the address book with the personal Box in the address book entry erasing process shown in FIG. 6.

Figure 9A:
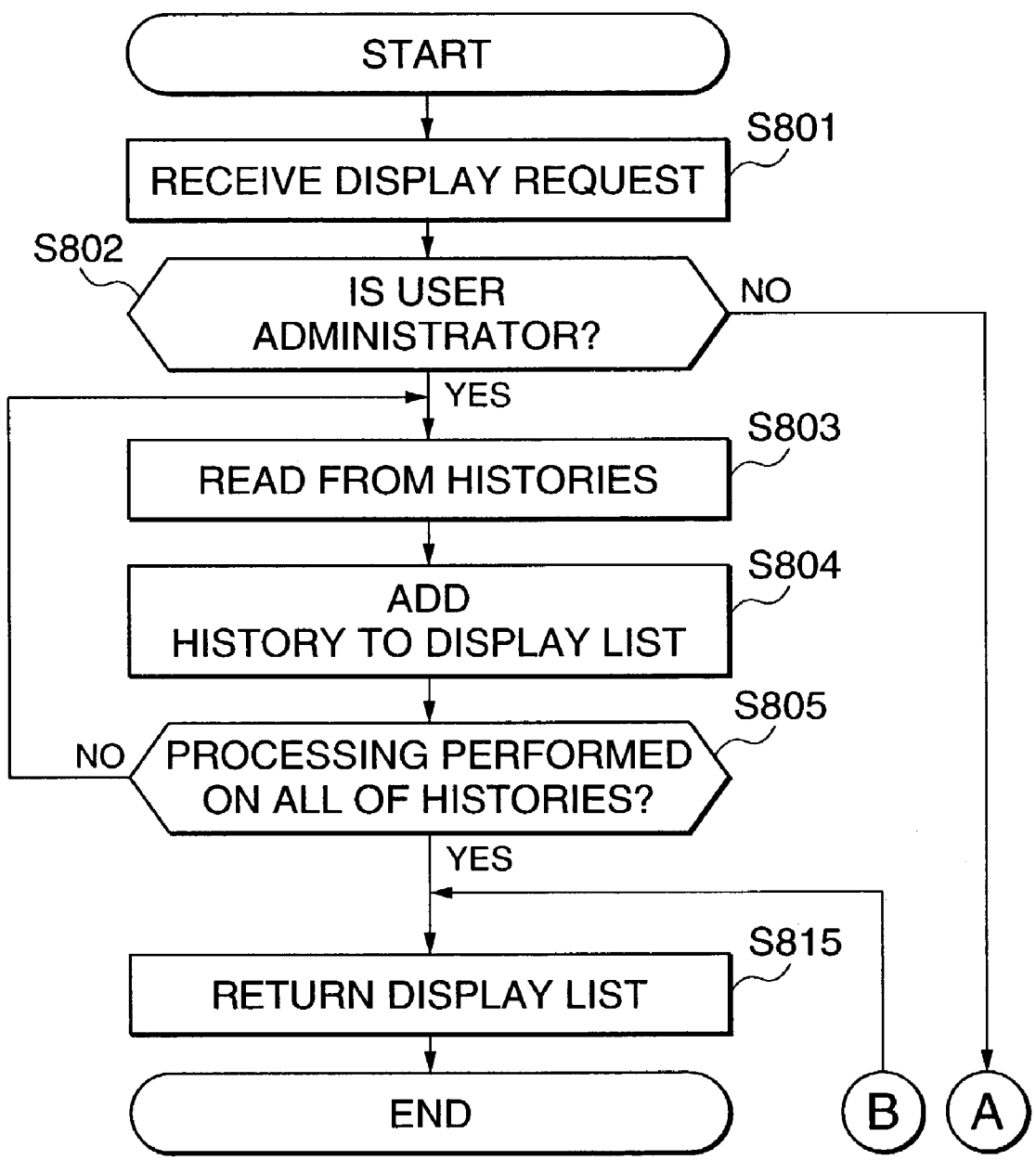
FIGS. 9A and 9B is a flow chart the procedure for determining the display range of communication histories by a service providing system according to a fourth embodiment of the present invention.
Figure 9B:
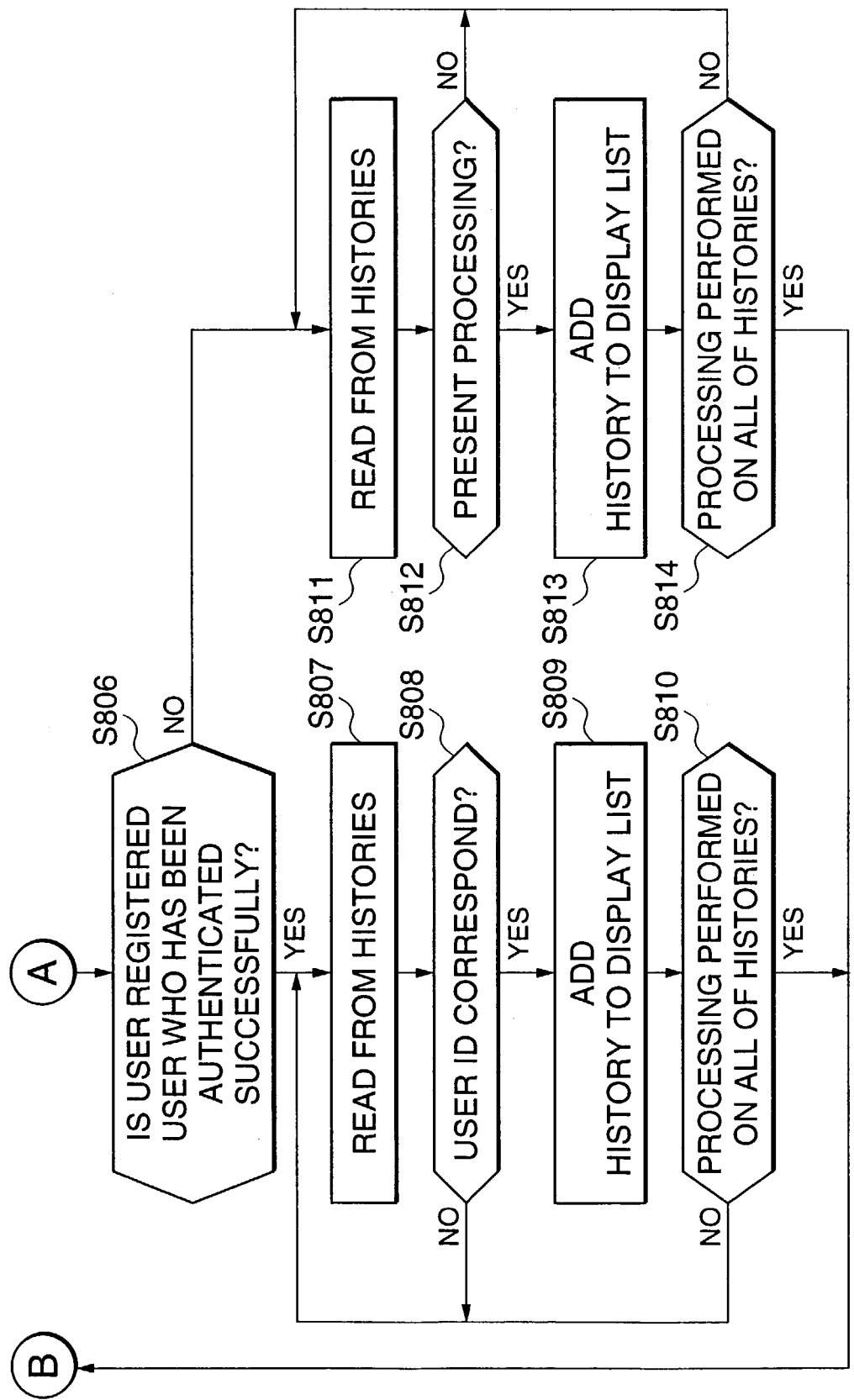
Figure 10A:
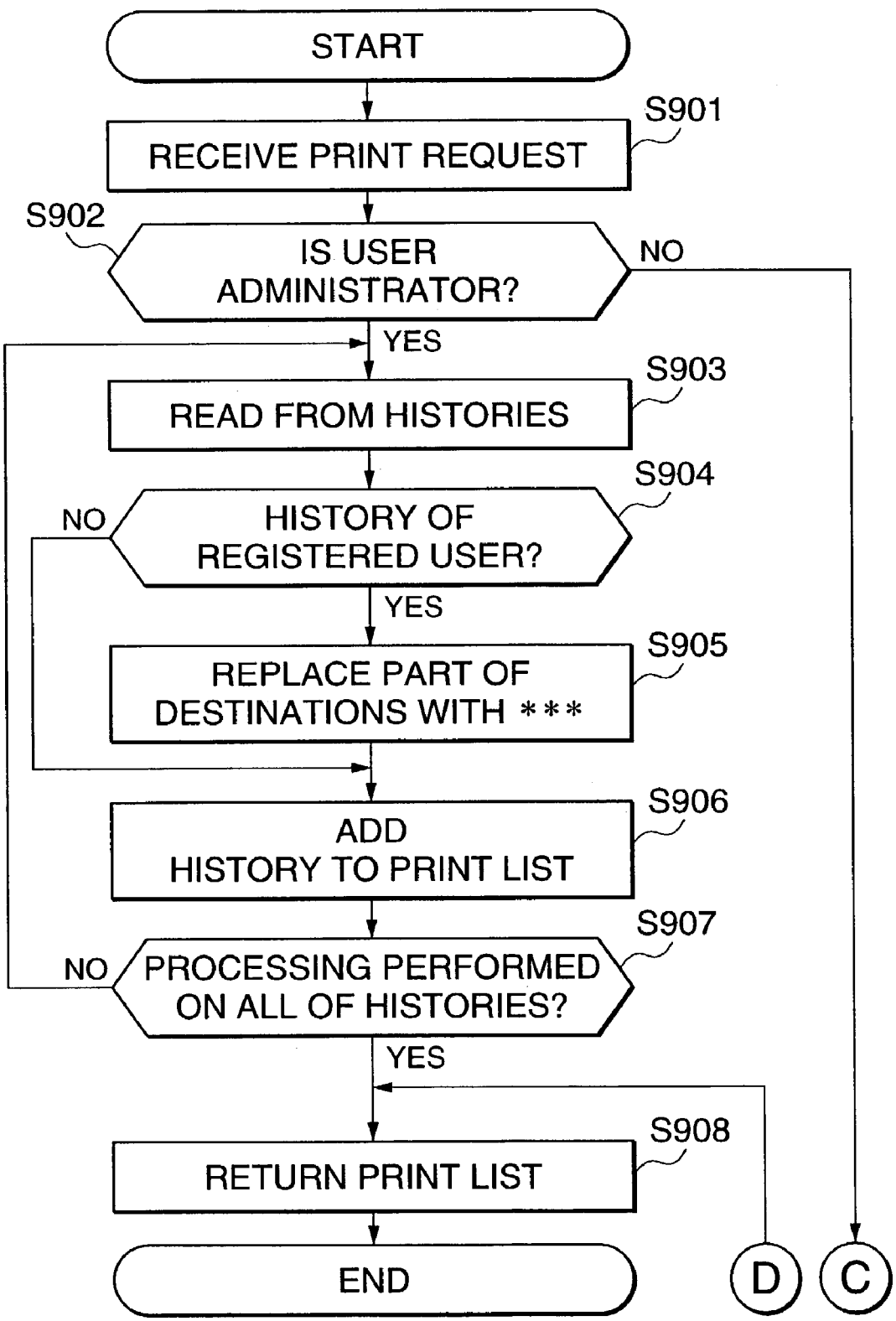
FIGS. 10A and 10B is a flow chart showing the procedure for a determining the print range of the communication histories by the service providing system according to the fourth embodiment.
Figure 10B:
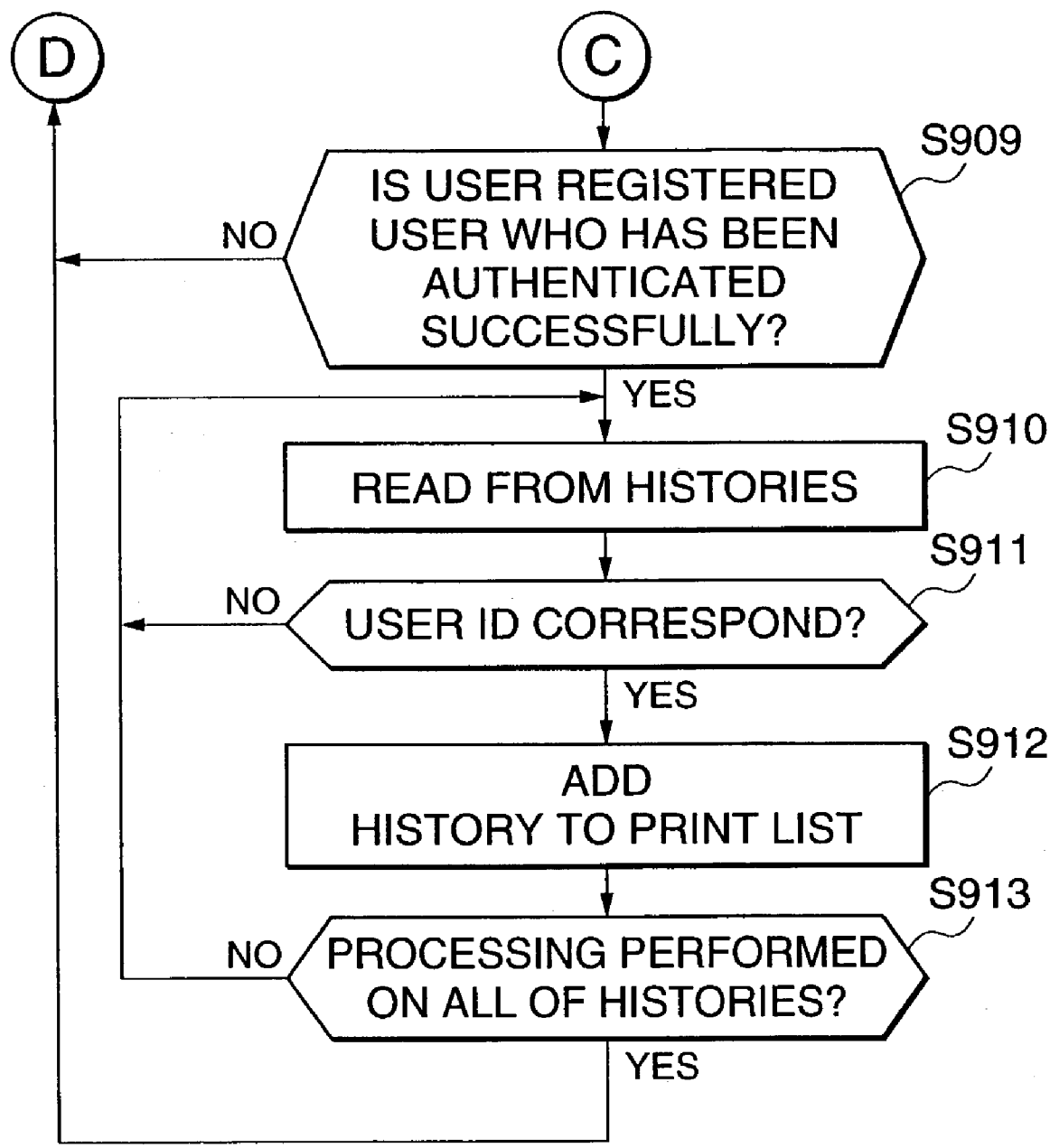

A description will now be given of a fourth embodiment of the present invention with reference to FIGS. 9A, 9B, 10A and 10B. FIGS. 9A and 9B is a flow chart showing the procedure for determining the display range of communication histories by a service providing system according to the fourth embodiment of the present invention, and FIGS. 10A and 10B is a flow chart showing the procedure for determining the print range of the communication histories by the service providing system according to the fourth embodiment. The arrangement of the service providing system according to the fourth embodiment is identical with that of the service providing system according to the first embodiment, and therefore a description thereof is omitted.

According to the present embodiment, it is arranged that service histories concerning the use of a service by users (in the present embodiment, communication histories) are held and managed, and a part of the service history corresponding to the user authenticated by the user authentication is displayed or printed.

To determine the display range of the communication history, first a history display request is received from the user via the operating section 105 in a step S801 as shown in FIGS. 9A and 9B. In the next step S802, it is determined whether the user who made the request is an administrator or not. If it is determined in the step S802 that the user who made the request is an administrator, a transmission/reception history is read from the memory 109 in a step S803, and in the next step S804, the read transmission/reception history is then added to a display list stored in a predetermined format in the memory 109. In a step S805, it is then determined whether processing has been performed on all of the histories or not. If it is determined in the step S805 that processing has not been performed on all of the histories, the process returns to the step S803. On the other hand, if it is determined in the step S805 that processing has been performed on all of the histories, the resulting display list is returned to the operating section 105 in a step S815. The display list returned to the operating section 105 is displayed on the display panel of the operating section 105. The process is then terminated.

If it is determined in the step S802 that the user who made the request is not an administrator, it is then determined in a step S806 whether or not the user who made the request is a registered user who has been authenticated successfully. If it is determined in the step S806 that the user who made the request is a registered user who has been authenticated successfully, a transmission/reception history is read from the memory 109 in a step S807, and it is determined in the next step S808 whether or not the read transmission/reception history corresponds to a user ID of the user who made the request. If it is determined in the step S808 that the read transmission/reception history does not correspond to the user ID of the user who made the request, the process returns to the step S807 wherein the next transmission/reception history is read.

If it is determined in the step S808 that the read transmission/reception history corresponds to the user ID of the user who made the request, the read transmission/reception history is added to the display list stored in the predetermined format in the memory 109 in a step S809. It is then determined in a step S810 whether processing has been performed on all of the histories or not. If it is determined in the step S810 that processing has not been performed on all of the histories, the process returns to the step S807. On the other hand, if it is determined in the step S810 that processing has been performed on all of the histories, the resulting display list is returned to the operating section 105 in the step S815. The display list returned to the operating section 105 is displayed on the display panel of the operating section 105. The process is then terminated.

If it is determined in the step S806 that the user who made the request is not a registered user who has been authenticated successfully, a transmission/reception history is read from the memory 109 in a step S811, and it is then determined in a step S812 whether or not the read transmission/reception history relates to a job on which operations are being performed. If the read transmission/reception history does not relate to a job on which operations are being performed, the process returns to the step S811 wherein the next transmission/reception history is read.

If it is determined in the step S812 that the read transmission/reception history relates to a job on which operations are being performed, the read transmission/reception history is added to the display list in the predetermined format in the memory 109 in a step S813. It is then determined in a step S814 whether processing has been performed on all of the histories or not. If it is determined in the step S814 that processing has not been performed on all of the histories, the process returns to the step S811. On the other hand, if it is determined in the step S814 that processing has been performed on all of the histories, the resulting display list is returned to the operating section 105 in the step S815. The display list returned to the operating section 105 is displayed on the display panel of the operating section 105. The process is then terminated.

Referring next to FIGS. 10A and 10B, a description will be given of the procedure for determining the print range of the communication history. To determine the print range of the communication history, as shown in FIGS. 10A and 10B, a history print request is received from the user via the operating section 105 first in a step S901, and it is then determined in a step S902 whether the user who made the request is an administrator or not. If it is determined in the step S902 that the user who made the request is an administrator, a transmission/reception history is read from the memory 109 in a step S903, and it is then determined in a step S904 whether the read transmission/reception history is concerned with the transmission/reception history of a registered user or not. If it is determined in the step S904 that the read transmission/reception history is concerned with the transmission/reception history of the registered user, a part of destinations is replaced with *** so that the part of the destinations can be made unrecognizable in a step S905. The process then proceeds to a step S906.

If it is determined in the step S904 that the read transmission/reception history is not concerned with the transmission/reception history of the registered user, the process proceeds to the step S906 with the step S905 being skipped.

In the step S906, the read transmission/reception history is added to a print list stored in a predetermined format in the memory 109. It is then determined in a step S907 whether processing has been performed on all of the histories or not. If it is determined in the step S907 that processing has not been performed on all of the histories, the process returns to the step S903. If it is determined in the step S907 that processing has been performed on all of the histories, the prepared print list is transmitted to the image forming section 101. The print list is printed and outputted by the image forming section 101. The process is then terminated.

If it is determined in the step S902 that the user who has made the request is not an administrator, it is then determined in a step S909 whether or not the user who made the request is a registered user who has been authenticated successfully. If it is determined in the step S909 that the user who made the request is a registered user who has been authenticated successfully, a transmission/reception history is read from the memory 109 in a step S910, and it is then determined in a step S911 whether the read transmission/reception history corresponds to the user ID of the user who made the request or not. If it is determined in the step S911 that the read transmission/reception history does not correspond to the user ID of the user who made the request, the process returns to the step S910 wherein the next transmission/reception history is read.

If it is determined in the step S911 that the read transmission/reception history corresponds to the user ID of the user who made the request, the read transmission/reception history is added to the display list stored in the predetermined format in the memory 109 in a step S912. It is then determined in a step S913 whether processing has been performed on all of the histories or not. If it is determined in the step S913 that processing has not been performed on all of the histories, the process returns to the step S910. On the other hand, if it is determined in the step S913 that processing has been performed on all of the histories, the resulting print list is transmitted to the image forming section 101 in the step S908. The print list is printed and outputted by the image forming section 101. The process is then terminated.

As described above, according to the present embodiment, it is possible to prevent personal information on a user from being leaked to other users referring to a communication history concerning the use of a service by the user.

It is to be understood that the object of the present invention may also be accomplished by supplying a system or an apparatus with a storage medium (or a recording medium) storing a program code of software which realizes the functions of any of the above described embodiments, and causing a computer (or CPU or MPU) of the system or apparatus to execute the supplied program code. In this case, the program code itself realizes the novel functions of the present invention, and hence the program code and the storage medium on which the program code is stored constitute the present invention. Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A service providing system comprising:
   a service providing apparatus that provides a service for a user; and
   a password issuing device that issues a password with an expiration date that is made to correspond to identification information held by the user according to payment of a fee by the user,
   wherein said service providing apparatus comprises setting data storage means for storing setting data relating to the service provided for the user, the setting data having at least one specific data range of the user, authenticating means for authenticating the user according to the identification information on the user, the password issued to the user, and the expiration date thereof, and setting data operation permitting means for giving a permission to perform an operation on the setting data to the user authenticated by said authenticating means; and
   setting data erasing means for erasing the at least one specific data range of the user from the setting data when the expiration date of the password has passed,
   wherein the setting data includes personal data that is specific to the user and common data,
   wherein said setting data operation permitting means gives a permission to perform an operation on personal data corresponding to the user in the setting data to the user authenticated by said authenticating means, and
   wherein the operation on the personal data comprises an editing operation including new registration and correction of the personal data.

2. A service providing system according to claim 1, wherein said service providing apparatus provides a data transmission service as the service, and the setting data comprises data representing destinations.

3. A service providing system according to claim 1, wherein said service providing apparatus comprises patterned service data storage means storing patterned service data to be added when the service is provided for the user, and patterned service data operation permitting means for giving a permission to perform an operation on the patterned service data to the user authenticated by said authenticating means.

4. A service providing system according to claim 3, wherein the patterned service data includes personal data that is specific to the user and common data, and said patterned service data operation permitting means gives a permission to perform an operation on personal data corresponding to the user in the patterned service data to the user authenticated by said authenticating means.

5. A service providing system according to claim 4, wherein the operation on the personal data comprises an editing operation including new registration and correction of the personal data.

6. A service providing system according to claim 4, wherein said service providing apparatus comprises patterned service data erasing means for erasing information contained in the personal data included in the patterned service data when the expiration date of the password has passed.

7. A service providing system according to claim 3, wherein the patterned service data comprises data representing destinations.

8. A service providing system according to claim 1, wherein said service providing apparatus comprises box function means including a plurality of boxes in which data is stored such that operations may be performed on the data, and box operation permitting means for giving the user authenticated by said authenticating means a permission to perform operations on the data stored in the box corresponding to the user.

9. A service providing system according to claim 8, wherein the operations on the data stored in the box include copying, printing, and transmission.

10. A service providing system according to claim 8, wherein said service providing apparatus comprises box erasing means for erasing the data stored in the box corresponding to the user when the expiration date of the password issued to the user has passed.

11. A service providing apparatus that provides a service for a user, comprising:
    authenticating means for authenticating the user according to identification information on the user, a password issued to the user, and an expiration date thereof;
    setting data storage means for storing setting data relating to the service provided for the user, the setting data having at least one specific data range of the user;
    setting data operation permitting means for giving a permission to perform an operation on the setting data to the user authenticated by said authentication means; and
    setting data erasing means for erasing the at least one specific data range of the user from the setting data when the expiration date of the password has passed,
    wherein the setting data includes personal data that is specific to the user and common data,
    wherein said setting data operation permitting means gives a permission to perform an operation on personal data corresponding to the user in the setting data to the user authenticated by said authenticating means, and
    wherein the operation on the personal data comprises an editing operation including new registration and correction of the personal data.

12. A service providing method for providing a service for a user, comprising the steps of:
    authenticating the user according to identification information on the user, a password issued to the user, and an expiration date thereof;
    storing setting data relating to the service provided for the user, the setting data having at least one specific data range of the user;
    giving a permission to perform an operation on the setting data to the authenticated user; and
    erasing the at least one specific data range of the user from the setting data when the expiration date of the password has passed,
    wherein the setting data includes personal data that is specific to the user and common data,
    wherein the permission giving step gives a permission to perform an operation on personal data corresponding to the user in the setting data to the user authenticated in the authenticating step, and
    wherein the operation on the personal data comprises an editing operation including new registration and correction of the personal data.

13. A computer-readable medium storing a program executable by a service providing apparatus that provides a service for a user, the program comprising:
- an authenticating module for authenticating the user according to identification information on the user, a password issued to the user, and an expiration date thereof;
- a setting data storing module for storing setting relating data to the service provided for the user, the setting data having at least one specific data range of the user;
- a setting data operation permitting module for giving a permission to perform an operation on the setting data to the user authenticated by said authentication module; and
- a setting data erasing module for erasing the at least one specific data range of the user from the setting data when the expiration date of the password has passed, wherein the setting data includes personal data that is specific to the user and common data, wherein the setting data operation permitting module gives a permission to perform an operation on personal data corresponding to the user in the setting data to the user authenticated by the authenticating module, and wherein the operation on the personal data comprises an editing operation including new registration and correction of the personal data.

* * * * *